*(12)* United States Patent
Davis et al.

US008103542B1

(10) Patent No.: US 8,103,542 B1
(45) Date of Patent: Jan. 24, 2012

(54) DIGITALLY MARKED OBJECTS AND PROMOTIONAL METHODS

(75) Inventors: Bruce L. Davis, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 2419 days.

(21) Appl. No.: 09/697,009

(22) Filed: Oct. 25, 2000

Related U.S. Application Data

(63) Continuation-in-part of application No. 09/343,104, filed on Jun. 29, 1999, now abandoned.

(51) Int. Cl.
*G06Q 30/00* (2006.01)
(52) U.S. Cl. ......... 705/14.1; 705/4; 705/14.57; 382/100
(58) Field of Classification Search .................... 705/14, 705/14.1, 4, 14.57
See application file for complete search history.

(56) References Cited

U.S. PATENT DOCUMENTS

| | | |
|---|---|---|
| 3,805,238 A | 4/1974 | Rothfjell |
| 3,845,391 A | 10/1974 | Crosby |
| 3,984,624 A | 10/1976 | Waggener |
| 4,238,849 A | 12/1980 | Gassmann |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,425,642 A | 1/1984 | Moses et al. |
| 4,528,588 A | 7/1985 | Löfberg |
| 4,547,804 A | 10/1985 | Greenberg |
| 4,672,605 A | 6/1987 | Hustig et al. |
| 4,674,041 A * | 6/1987 | Lemon et al. .................... 705/14 |
| 4,675,746 A | 6/1987 | Tetrick et al. |
| 4,689,477 A | 8/1987 | Goldman |
| 4,750,173 A | 6/1988 | Blüthgen |
| 4,807,031 A | 2/1989 | Broughton et al. |
| 4,855,827 A | 8/1989 | Best |
| 4,888,798 A | 12/1989 | Earnest |
| 4,908,836 A | 3/1990 | Rushforth et al. |
| 4,947,028 A | 8/1990 | Gorog |
| 4,969,041 A | 11/1990 | O'Grady et al. |
| 4,972,476 A | 11/1990 | Nathans |
| 4,977,594 A | 12/1990 | Shear |
| 4,993,068 A | 2/1991 | Piosenka |
| 5,023,907 A | 6/1991 | Johnson |
| 5,053,956 A | 10/1991 | Donald et al. |
| 5,103,459 A | 4/1992 | Gilhousen et al. |
| 5,113,518 A | 5/1992 | Durst |
| 5,138,712 A | 8/1992 | Corbin |
| 5,146,457 A | 9/1992 | Veldhuis et al. |
| 5,243,423 A | 9/1993 | DeJean et al. |
| 5,262,860 A | 11/1993 | Fitzpatrick |
| 5,288,976 A | 2/1994 | Citron |
| 5,319,453 A | 6/1994 | Copriza |
| 5,319,735 A | 6/1994 | Preuss et al. |
| 5,337,361 A | 8/1994 | Wang |
| 5,379,345 A | 1/1995 | Greenberg |
| 5,384,846 A | 1/1995 | Berson |
| 5,385,371 A | 1/1995 | Izawa |
| 5,428,731 A | 6/1995 | Powers |
| 5,446,273 A | 8/1995 | Leslie |
| 5,463,209 A | 10/1995 | Figh |
| 5,469,506 A | 11/1995 | Berson |
| 5,471,533 A | 11/1995 | Wang |
| 5,483,049 A * | 1/1996 | Schulze, Jr. .................... 705/14 |
| 5,493,677 A | 2/1996 | Bfalogh |
| 5,495,411 A | 2/1996 | Ananda |
| 5,495,581 A | 2/1996 | Tsai |
| 5,496,071 A | 3/1996 | Walsh |
| 5,502,576 A | 3/1996 | Ramsay et al. |
| 5,524,933 A | 6/1996 | Kunt et al. |
| 5,530,852 A | 6/1996 | Meske |
| 5,548,645 A | 8/1996 | Ananda |
| 5,553,143 A | 9/1996 | Ross |
| 5,579,479 A | 11/1996 | Plum |
| 5,613,004 A | 3/1997 | Cooperman |
| 5,629,980 A | 5/1997 | Stefik |
| 5,634,012 A | 5/1997 | Stefik |
| 5,636,276 A | 6/1997 | Brugger |
| 5,638,443 A | 6/1997 | Stefik |
| 5,640,193 A | 6/1997 | Wellner |
| 5,646,997 A | 7/1997 | Barton |
| 5,646,999 A | 7/1997 | Saito |
| 5,652,626 A | 7/1997 | Kawakami et al. |
| 5,652,714 A | 7/1997 | Peterson |
| 5,657,462 A | 8/1997 | Brouwer |

(Continued)

FOREIGN PATENT DOCUMENTS

EP 493091 1/1992

(Continued)

OTHER PUBLICATIONS

Kaye et al, "PC Dinners, Mr. Java and Counter Intelligence: Prototyping Smart Appliances for the Kitchen," MIT Media Lab, Feb. 14, 2000.
Kaye, "Counter Intelligence & Kitchen Sync," MIT Media Lab, Oct. 1998.
Kaye et al, "PC Dinners, Mr. Java and Counter Intelligence: Prototyping Smart Appliances for the Kitchen," MIT Media Lab, Feb. 14, 2000.
Kaye, "Counter Intelligence & Kitchen Sync," MIT Media Lab, Oct. 1998.
Mintzer et al., "Safeguarding Digital Library Contents and Users" Digital Watermarking, D-Lib. Magazine, Dec. 1997: ISSN 1082-9873, 16 pages.
"Multimedia Mixed Object Envelopes Supporting a Graduated Fee Scheme via Encryption, " IBM Technical Disclosure Bulletin: vol. 37, No. 03, Mar. 1994, p. 413-417.
U.S. Appl. No. 09/343,101, filed Jun. 29, 1999, Bruce L. Davis, et al.
U.S. Appl. No. 09/343,104, filed Jun. 29, 1999, Tony F. Rodriguez, et al.

(Continued)

*Primary Examiner* — Raquel Alvarez

(57) ABSTRACT

Digitally marked objects and promotional methods include presenting a digitally watermarked object to a reader device at a first location, decoding information from the watermark, and triggering a first response thereto. The method also includes presenting the object to a reader device at a second location, decoding information from the watermark, and triggering a second, different, response thereto.

11 Claims, No Drawings

U.S. PATENT DOCUMENTS

| | | |
|---|---|---|
| 5,659,164 A | 8/1997 | Schmid |
| 5,659,726 A | 8/1997 | Sandford |
| 5,663,766 A | 9/1997 | Sizer, II |
| 5,671,277 A | 9/1997 | Ikenoue et al. |
| 5,673,316 A | 9/1997 | Auerbach et al. |
| 5,687,236 A | 11/1997 | Moskowitz et al. |
| 5,715,403 A | 2/1998 | Stefik |
| 5,721,788 A | 2/1998 | Powell |
| 5,734,119 A | 3/1998 | France |
| 5,742,845 A | 4/1998 | Wagner |
| 5,761,686 A | 6/1998 | Bloomberg |
| 5,765,152 A | 6/1998 | Erickson |
| 5,768,426 A | 6/1998 | Rhoads |
| 5,774,452 A | 6/1998 | Wolosewicz |
| 5,778,102 A | 7/1998 | Sandford, II et al. |
| 5,801,687 A | 9/1998 | Peterson |
| 5,809,317 A | 9/1998 | Kogan |
| 5,818,441 A | 10/1998 | Throckmorton |
| 5,822,436 A | 10/1998 | Rhoads |
| 5,828,325 A | 10/1998 | Wolosewicz et al. |
| 5,832,119 A | 11/1998 | Rhoads |
| 5,841,886 A | 11/1998 | Rhoads |
| 5,841,978 A | 11/1998 | Rhoads |
| 5,845,281 A | 12/1998 | Benson |
| 5,848,424 A | 12/1998 | Scheinkman |
| 5,850,481 A | 12/1998 | Rhoads |
| 5,852,673 A | 12/1998 | Young |
| RE40,919 E | 1/1999 | Rhoads |
| 5,857,038 A | 1/1999 | Owada et al. |
| 5,862,260 A | 1/1999 | Rhoads |
| 5,872,589 A | 2/1999 | Morales |
| 5,892,900 A | 4/1999 | Ginter et al. |
| 5,893,910 A | 4/1999 | Martineau |
| 5,900,608 A | 5/1999 | Iida |
| 5,905,248 A | 5/1999 | Russell et al. |
| 5,905,800 A | 5/1999 | Moskowitz et al. |
| 5,915,027 A | 6/1999 | Cox et al. |
| 5,919,730 A | 7/1999 | Gasper et al. |
| 5,920,861 A | 7/1999 | Hall |
| 5,920,878 A | 7/1999 | DeMont |
| 5,926,822 A | 7/1999 | Garman |
| 5,932,862 A | 8/1999 | Hussey |
| 5,932,863 A | 8/1999 | Rathus |
| 5,974,141 A | 10/1999 | Saito |
| 5,978,773 A * | 11/1999 | Hudetz et al. .................. 705/23 |
| 5,983,218 A | 11/1999 | Syeda-Mahmood |
| 5,991,876 A | 11/1999 | Johnson |
| 6,014,634 A * | 1/2000 | Scroggie et al. ................ 705/14 |
| 6,052,486 A | 4/2000 | Knowlton et al. |
| 6,084,528 A | 7/2000 | Beach et al. |
| 6,095,566 A | 8/2000 | Yamamoto |
| 6,107,932 A | 8/2000 | Walker et al. |
| 6,108,656 A * | 8/2000 | Durst et al. .................... 707/10 |
| 6,122,403 A | 9/2000 | Rhoads |
| 6,138,151 A | 10/2000 | Reber et al. |
| 6,148,331 A * | 11/2000 | Parry ........................... 709/218 |
| 6,199,048 B1 | 3/2001 | Hudetz et al. |
| 6,229,924 B1 | 5/2001 | Rhoads et al. |
| 6,286,036 B1 | 9/2001 | Rhoads |
| 6,292,092 B1 | 9/2001 | Chow |
| 6,307,949 B1 | 10/2001 | Rhoads |
| 6,311,214 B1 | 10/2001 | Rhoads |
| 6,321,208 B1 * | 11/2001 | Barnett et al. .................. 705/14 |
| 6,321,992 B1 | 11/2001 | Knowles et al. |
| 6,324,573 B1 | 11/2001 | Rhoads |
| 6,325,420 B1 | 12/2001 | Zhang et al. |
| 6,332,149 B1 | 12/2001 | Warmus et al. |
| 6,334,721 B1 | 1/2002 | Horigane |
| 6,343,204 B1 | 1/2002 | Yang |
| 6,351,815 B1 | 2/2002 | Adams |
| 6,381,341 B1 | 4/2002 | Rhoads |
| 6,385,329 B1 | 5/2002 | Sharma et al. |
| 6,408,082 B1 | 6/2002 | Rhoads et al. |
| 6,408,331 B1 | 6/2002 | Rhoads |
| 6,526,449 B1 | 6/2002 | Silverbrook et al. |
| 6,421,070 B1 | 7/2002 | Ramos et al. |
| 6,424,725 B1 | 7/2002 | Rhoads et al. |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,553,129 B1 | 4/2003 | Rhoads |
| 6,567,533 B1 | 5/2003 | Rhoads |
| 6,580,808 B2 | 6/2003 | Rhoads |
| 6,590,996 B1 | 7/2003 | Reed et al. |
| 6,611,607 B1 | 8/2003 | Davis et al. |
| 6,614,914 B1 | 9/2003 | Rhoads et al. |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,392 B1 | 8/2004 | Rhoads |
| 6,798,894 B2 | 9/2004 | Rhoads |
| 6,813,366 B1 | 11/2004 | Rhoads |
| 6,879,701 B1 | 4/2005 | Rhoads |
| 6,917,724 B2 | 7/2005 | Seder et al. |
| 6,920,232 B2 | 7/2005 | Rhoads |
| 6,947,571 B1 | 9/2005 | Rhoads et al. |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Hein et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |

| | | |
|---|---|---|
| 7,537,170 B2 | 5/2009 | Reed et al. |
| 7,545,952 B2 | 6/2009 | Brundage et al. |
| 7,564,992 B2 | 7/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Jones et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,945,781 B1 | 5/2011 | Rhoads |
| 7,949,147 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,970,166 B2 | 6/2011 | Carr et al. |
| 7,970,167 B2 | 6/2011 | Rhoads |
| 2001/0001854 A1 | 5/2001 | Schena et al. |
| 2001/0006585 A1 | 7/2001 | Horigane |
| 2001/0034705 A1 | 10/2001 | Rhoads et al. |
| 2001/0055407 A1 | 12/2001 | Rhoads |
| 2002/0009208 A1 | 1/2002 | Alattar et al. |
| 2002/0012445 A1 | 1/2002 | Perry |
| 2002/0016816 A1 | 2/2002 | Rhoads |
| 2002/0023148 A1 | 2/2002 | Ritz et al. |
| 2002/0048369 A1 | 4/2002 | Ginter et al. |
| 2002/0048621 A1 | 4/2002 | Boyd et al. |
| 2002/0059162 A1 | 5/2002 | Shinoda et al. |
| 2002/0075298 A1 | 6/2002 | Schena et al. |
| 2002/0080396 A1 | 6/2002 | Silverbrook et al. |
| 2002/0091575 A1 | 7/2002 | Collart |
| 2002/0122568 A1 | 9/2002 | Zhao |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0040957 A1 | 2/2003 | Rodriguez et al. |
| 2003/0105730 A1 | 6/2003 | Rhoads et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0286572 A1 | 11/2009 | Rhoads et al. |
| 2010/0045816 A1 | 2/2010 | Rhoads |
| 2010/0062819 A1 | 3/2010 | Hannigan et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| EP | 629972 | 12/1994 |
| EP | 642060 | 3/1995 |
| EP | 650146 | 4/1995 |
| JP | 8-50598 | 2/1996 |
| WO | 94/27228 | 11/1994 |
| WO | 95/14289 | 5/1995 |
| WO | 95/20291 | 7/1995 |
| WO | 96/27259 | 9/1996 |
| WO | 96/36163 | 11/1996 |

OTHER PUBLICATIONS

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/507,096, filed Feb. 17, 2000, Geoffrey B. Rhoads, et al.

U.S. Appl. No. 09/552,998, Apr. 19, 2000, Tony F. Rodriguez, et al.

U.S. Appl. No. 09/567,405, filed May. 8, 2000, Geoffrey B. Rhoads, et al.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/689,289, filed Oct. 11, 2000, Geoffrey B. Rhoads, et al.

U.S. Appl. No. 09/697,015, filed Oct. 25, 2000, Bruce L Davis, et al.

U.S. Appl. No. 12/844,651, filed Jul. 27, 2010, Alastair M. Reed, et al.

U.S. Appl. No. 13/084,981, filed Apr. 12, 2011, Geoffrey B. Rhoads.

Bruckstein, A.M.; Richardson, T.J., "A Holographic Transform Domain Image Watermarking Method, Circuits, Systems, and Signal Processing" vol. 17, No. 3, 38 pages, 1998. This paper includes an appendix containing an internal memo of Bell Labs, which according to the authors of the paper, was dated Sep. 1994.

Chow et al., "Forgery and Tamper-Proof Identification Document," IEEE Proc. 1993 Inc. Camahan Conf. on Security Technology, Oct. 1993, pp. 11-14.

Dautzenberg, "Watermarking Images, "Department of Microelectronics and Electrical Engineering, Trinity College Dublin, 58 pages, Oct. 1994.

"High Water FBI Limited Presentation Image Copyright Protection Software," FBI Ltd. brochure, Jul. 1995, 17 pages.

Kawaguchi et al., "Principle and Applications of BPCS Staganography," Proc. SPIE vol. 3528, Multimedia Systems and Applications, Nov. 2-4, 1998, pp. 464-473.

Komatsu et al., "Authentication System Using Concealed Image in Telematics," Memoirs of the School of Science and Engineering, Wasdea Univ., No. 52, 1988, pp. 45-60.

Szepanski, " Additive Binary Data Transmission for Video Signals," Papers Presented at Conf. of Comm. Engineering Soc. Sep. 30-Oct. 3, 1980, Technical Reports vol. 74, 19 pages.

Tirkel et al, "Electronic Water Mark," DICTA-93, Macquarie University, Sydney, Australia, Dec. 1993, pp. 666-673.

U.S. Appl. No. 60/000,442, filed Jun. 20, 1995, "Method and Apparatus for Interfacing with Remote Computers".

Brassil, "Electronic Marking and Identification Techniques," Proc. Of INFOCOM/94 Conf. On Computer, IEEE Commun. Soc. Conf., Issued Jun. 12-16, 1994, pp. 1278-1287.

"Copyright Protection for Digital Images, Digital Fingerprinting from FBI," Highwater FBI brochure, Jan. 1995, 4 pages.

Koch, "Copyright Protection for Multimedia Data," Proc. Of the Int. Conf. On Digital Media and Electronic Publishing, Leeds, U.K., 15 pages, Dec. 1994.

Kurak et al., " A Cautionary Note on Image Downgrading," Dec. 1992 IEEE, pp. 153-159.

Zhao et al. "Embedding Robust Labels Into Images for Copyright Protection," Proc. Of the International Congress on Intellectual Property Rights for Specialized Information, Knowledge and New Technologies, Vienna, Austria Aug. 21-25, 1995,10 pages.

* cited by examiner

DIGITALLY MARKED OBJECTS AND PROMOTIONAL METHODS

RELATED APPLICATION DATA

This application is a continuation-in-part of copending application Ser. No. 09/343,104, filed Jun. 29, 1999.

FIELD OF THE INVENTION

The present invention relates to using digitally marked objects (e.g., watermarked or bar-coded objects) in conjunction with promotional campaigns (e.g., issuing coupons and premiums).

BACKGROUND AND SUMMARY OF THE INVENTION

As disclosed in the parent application, physical objects can be encoded with digital data. When sensed by a compliant device, the digital data can be used to direct a web browser to an internet web page corresponding to the object.

One such system marks the objects in a generally human-imperceptible manner using digital watermark technology. For example, a photograph in a magazine advertisement can be subtly changed, in local luminance detail, to encode a 32 bit number (an object identifier). Image data corresponding to the photograph can be sensed by a web cam or the like, and processed by an associated computing device to decode the 32 bit object identifier. This identifier can then be transmitted, by the device, to a remote database. The database uses the identifier to access a corresponding database record. In the record is information relating to the object, including the URL or an associated web page. The database transmits this URL address back to the device. The device, in turn, launches a web browser (or if already launched, then directs the running web browser) to the specified URL. The web page at that URL is then displayed to the user who initially presented the object to the web cam. Such arrangements are further detailed in the cited parent application.

A great variety of particular watermarking techniques are known to artisans in the field. One particular technique is shown in application Ser. No. 09/503,881, filed Feb. 14, 2000.

In accordance with one aspect of the present invention, a coffee cup, or a coffee cup jacket, is encoded with digital data. A reader terminal in a coffee shop senses the data and responds in a manner specified by information in the associated database record. Instead of directing a web browser to an associated web page, the information returned by the database can be used, e.g., to issue the consumer a premium, such as a coupon good for merchandise in the store. The cups can be produced in large volume—all encoded with the same digital data. The response to this fixed data can be changed daily, weekly, etc., by updating data in the database accordingly. Thus, an inventory of cups produced months ago can be used in conjunction with promotion of products newly arrived at the store. Moreover, the digital data can trigger different responses when sensed at different locations (e.g., store, office).

The foregoing and additional features and objects of the invention will be more readily apparent from the following detailed description.

DETAILED DESCRIPTION

As noted, a coffee shop distributes coffee in cups (or in jacketed cups) encoded with digital object identifiers. The shop is equipped with a reader terminal to which the cup can be presented. The reader terminal may be at the counter having cream, sugar, etc. The counter may be arranged to encourage the consumer to place the cup at a location that is optimized for reading with a fixed web cam.

When the digital object identifier on the cup is sensed by the reader terminal, it is dispatched to a database, which may be in the store or remote. The database accesses a data record corresponding to that identifier. Stored in the data record is information specifying the response that should be provided. The response can be display of a corresponding HTML document (e.g., by directing the terminal to load a corresponding web page). But in one particular embodiment, the response is to print a coupon.

The coupon may be printed with a label printer, or other small footprint device. The printer may use blank paper stock, or paper stock with a pre-printed border, background, etc. The text to be printed on the paper can be stored in the database record corresponding to the identifier. The database can relay this text to the terminal for printing. (Other arrangements are, of course, possible. For example, the database can simply store a number that identifies a text message stored in the terminal at a corresponding address, etc.) Thus, by placing the coffee cup within view of the terminal, the customer is issued a coupon.

One feature of this arrangement is that the response can be tailored by changing the information stored in the database record, rather than changing the identifier with which the cup is encoded. So cups/jackets can be printed in large volumes— all with the same identifier. One week the terminal may respond to such cups by issuing a coupon good for Thanksgiving merchandise. The next week the terminal may respond by issuing coupons good for Christmas merchandise, etc. The next week a product newly introduced by the store may be promoted, etc.

Instead of issuing cents-off coupons, the terminal may award prize coupons. In some systems, cents-off coupons may generally be awarded, but prize coupons may be randomly issued.

When the customer leaves the store and takes the cup down the street, other stores may have similar terminals. Presenting the cup to other merchants' terminals can yield different coupons or prizes. That is, the response triggered by a cup can be context-dependent. The same object identifier is sensed by all terminals, but the databases consulted may be different, or information about the location/context of the terminal is relayed to a shared database, permitting the terminals—and corresponding responses—to be differentiated. Thus, presenting the cup at the coffee store may result in award of a coupon for a free daily newspaper, and presenting the cup to the bagel shop down the street may result in award of a coupon for a free spread on a purchased bagel.

If the cup is taken to the purchaser's home or office, and presented to a web cam-equipped computer with suitable software (e.g., the present assignee's Digimarc MediaBridge software), still further coupons/incentives may be provided.

Prizes may be awarded upon visiting a specified circuit of locations. Showing a coffee cup to each of the Starbucks stores in a city may result in award of a $20 gift certificate when the last one is visited.

The objects marked, of course, needn't be coffee cups/jackets. Any object can be employed. Even clothing can be utilized. A Habitat for Humanity t-shirt may be encoded with digital data. If shown to a terminal at Starbucks, a first type of premium may be awarded. If shown to a terminal at Mrs. Fields' Cookies, a second type of premium may be awarded.

Instead of awarding physical tokens (e.g., coupons) or presenting corresponding web pages, the terminals can respond otherwise. For example, the terminal can add "points" to different accounts (e.g., frequent flier accounts). Terminals can be provided at tourist destinations, airports, etc. Users who present encoded objects (e.g., American Express cards, frequent flier membership cards, etc.) can be awarded points. Premiums may be issued not just when point tallies cross predetermined thresholds (e.g., 25000 miles for a free roundtrip airfare), but also when other metrics are reached. For example, a user who presents his Amex card to terminals in all 50 states may be awarded a premium such as a round trip ticket to Europe.

The response of the terminal needn't be a premium; it can be informational. A purchaser of an espresso machine at a coffee shop may present the box to a terminal. The terminal may respond by printing information associated with the product—so the consumer does not need to rely on printed materials inside the box that may be out of date.

Objects needn't be marked with just one identifier. A product box may have a different identifier encoded on each of its six faces. A card, such as an American Express card, may have one identifier encoded on the front face, and a different identifier encoded on the reverse. Each face triggers a different response. Or two or more watermarks may occupy the same region of an object. The marks may be recognized by different systems, and may trigger different responses. The marks may serve different purposes, e.g., one to distinguish counterfeits from originals, another as part of a promotional campaign. (The use of watermarks to distinguish originals from counterfeits is disclosed in application Ser. No. 09/498,223, filed Feb. 3, 2000, now U.S. Pat. No. 6,574,350.)

Further concerning some of the concepts detailed in the parent application, blow-in cards found in magazines and the like (e.g., subscription cards) can be encoded with object identifiers. When presented to a computer running Digimarc MediaBridge software, the computer can pass the object identifier to the remote database. The remote database can respond by presenting a template on the user's screen, with information such as name, address, etc., already filled-in using user profile information stored in the user's computer. This information can be reviewed by the user for accuracy, and then dispatched with a single mouse-click. Such arrangements are widely applicable beyond the particular context of blow-in cards (and can naturally be varied in numerous implementation details).

To provide a comprehensive disclosure without unduly lengthening this specification, applicants incorporate by reference the cited patent applications.

Having described and illustrated the principles of the invention with reference to illustrative embodiments, it should be recognized that the invention is not so limited.

For example, while the detailed embodiments employed digital watermarking, other machine-readable data representations can be used instead (e.g., bar codes, glyphs, RF IDs, mag stripes, smart card technology, etc.).

The reference to internet terminals in the foregoing discussion should not be taken as limiting applicability of the invention to any particular form of hardware (e.g., desktop computers or kiosks). Any internet-enabled device or appliance can utilize the principles detailed herein, including cell phones and other wireless devices, personal digital assistants, web-enabled entertainment appliances, etc., etc. Moreover, while full-time internet access by such devices is preferred, the same principles can be employed in other applications, e.g., in which product identifiers are cached when internet access is not available, and utilized (e.g., sent) when access is thereafter provided.

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method comprising:
    decoding, using a first digital watermark reader device at a first location, a watermark from a digitally watermarked object, wherein the decoding the watermark from the digitally watermark object triggers a first response thereby;
    decoding, using a second digital watermark reader device at a second location, the watermark from the digitally watermarked object, wherein the decoding the watermark from the digitally watermark object triggers a second, different, response thereby, wherein at least one of the responses comprises an issuance of a coupon.

2. The method of claim 1, wherein the digitally watermarked object comprises a coffee cup or a jacket for a coffee cup.

3. A method comprising:
    decoding, using a first reader device at a first location, a watermark from a digitally watermarked object;
    decoding information from the watermark:
    triggering a first response based in part on the decoding of the watermark;
    decoding, using a second reader device at a second location, the watermark from the digitally watermarked object
    decoding the information from the watermark; and
    triggering a second, different, response based in part on the decoding of the watermark.

4. The method of claim 3, wherein at least one of the responses comprises an issuance of a coupon.

5. The method of claim 3, wherein the digitally watermarked object comprises a coffee cup or a jacket for a coffee cup.

6. A non-transitory computer-readable medium having instructions stored thereon, the instructions comprising:
    instructions to decode a watermark from a digitally watermarked object;
    instructions to decode information from the watermark;
    instructions to send the information to a database;
    instructions to trigger a first response based on data received from the database, wherein the response is based in part on the watermark being previously decoded at a separate location, wherein a triggered response at the separate location is different than the first response, and wherein at least one of the responses comprises the issuance of a coupon.

7. The non-transitory computer-readable medium of claim 6, wherein the digitally watermarked object comprises a coffee cup or a jacket for a coffee cup.

8. A non-transitory computer-readable medium having instructions stored thereon, the instructions comprising:
- instructions to decode a watermark from a digitally watermarked object;
- instructions to decode information from the watermark;
- instructions to send the information to a database;
- instructions to trigger a first response based on data received from the database, wherein the response is based in part on the watermark being previously decoded at a separate location, and wherein a triggered response at the separate location is different than the first response.

9. The non-transitory computer-readable medium of claim 8, wherein the first response comprises the issuance of a coupon.

10. The non-transitory computer-readable medium of claim 8, wherein the triggered response comprises the issuance of a coupon.

11. The non-transitory computer-readable medium of claim 8, wherein the digitally watermarked object comprises a coffee cup or a jacket for a coffee cup.

* * * * *

UNITED STATES PATENT AND TRADEMARK OFFICE
CERTIFICATE OF CORRECTION

| | | |
|---|---|---|
| PATENT NO. | : 8,103,542 B1 | |
| APPLICATION NO. | : 09/697009 | |
| DATED | : January 24, 2012 | |
| INVENTOR(S) | : Davis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2988 days.

Page 3, item (56), under "Other Publications", in Column 2, Line 5, delete "Apr. 19, 2000," and insert -- filed Apr. 19, 2000, --.

Page 3, item (56), under "Other Publications", in Column 2, Line 22, delete "Camahan" and insert -- Carnahan --.

Page 3, item (56), under "Other Publications", in Column 2, Line 27, delete ""High Water" and insert -- "HighWater --.

Page 3, item (56), under "Other Publications", in Column 2, Line 30, delete "Staganography,"" and insert -- Steganography," --.

Page 3, item (56), under "Other Publications", in Column 2, Line 34, delete "Wasdea" and insert -- Waseda --.

Page 3, item (56), under "Other Publications", in Column 2, Line 38, delete "Water Mark,"" and insert -- Watermark," --.

Column 1, lines 6-7, delete "of copending application" and insert -- of application --.

Signed and Sealed this
Third Day of July, 2012

David J. Kappos
*Director of the United States Patent and Trademark Office*

CERTIFICATE OF CORRECTION (continued)
U.S. Pat. No. 8,103,542 B1

Column 4, line 46, in Claim 3, delete "watermark:" and insert -- watermark; --.

Column 4, line 51, in Claim 3, delete "object" and insert -- object; --.